(12) United States Patent
Yang

(10) Patent No.: US 11,108,547 B2
(45) Date of Patent: Aug. 31, 2021

(54) METHODS AND APPARATUSES FOR READING BLOCKCHAIN DATA

(71) Applicant: Advanced New Technologies Co., Ltd., Grand Cayman (KY)

(72) Inventor: Xinying Yang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/162,760

(22) Filed: Jan. 29, 2021

(65) Prior Publication Data

US 2021/0184837 A1    Jun. 17, 2021

Related U.S. Application Data

(63) Continuation of application No. PCT/CN2019/108054, filed on Sep. 26, 2019.

(30) Foreign Application Priority Data

Nov. 7, 2018 (CN) .......................... 201811320468.3

(51) Int. Cl.
*H04L 9/06* (2006.01)
*G06Q 20/38* (2012.01)
*H04L 9/32* (2006.01)

(52) U.S. Cl.
CPC ..... *H04L 9/0643* (2013.01); *G06Q 20/38215* (2013.01); *H04L 9/3265* (2013.01); *H04L 2209/38* (2013.01)

(58) Field of Classification Search
CPC . H04L 9/0643; H04L 9/3265; H04L 2209/38; G06Q 20/38215

(Continued)

(56) References Cited

U.S. PATENT DOCUMENTS 9,824,031 B1 *  11/2017  Ganti ................... G06Q 20/023
10,747,609 B1 *  8/2020  Griffin .................. H04L 9/3239
(Continued)

FOREIGN PATENT DOCUMENTS

CN         106534085         3/2017
CN         106991334         7/2017
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Tae K Kim
*Assistant Examiner* — Peiliang Pan
(74) *Attorney, Agent, or Firm* — Fish & Richardson P.C.

(57) ABSTRACT

Methods and apparatuses for retrieving blockchain data are disclosed. One method comprises: receiving a data retrieving request that comprises a target transaction identifier; identifying a transaction storage location that corresponds to the target transaction identifier as a target transaction storage location based on a pre-stored correspondence between transaction identifiers of transactions recorded on a blockchain associated with the blockchain network and transaction storage locations of the transactions; and retrieving data from the target transaction storage location in the blockchain.

15 Claims, 11 Drawing Sheets

(58) Field of Classification Search
USPC .......................................................... 713/157
See application file for complete search history.

(56) References Cited

U.S. PATENT DOCUMENTS

| | | | |
|---|---|---|---|
| 2019/0074962 A1* | 3/2019 | Ateniese | H04L 63/061 |
| 2020/0177603 A1* | 6/2020 | Wang | G06Q 20/382 |
| 2020/0204352 A1* | 6/2020 | Thompson | H04L 9/3239 |
| 2020/0258085 A1* | 8/2020 | Moustakas | G06Q 20/3827 |

FOREIGN PATENT DOCUMENTS

| | | |
|---|---|---|
| CN | 107426170 | 12/2017 |
| CN | 107562775 | 1/2018 |
| CN | 107579958 | 1/2018 |
| CN | 107918666 | 4/2018 |
| CN | 108171494 | 6/2018 |
| CN | 108646983 | 10/2018 |
| CN | 110011800 | 7/2019 |
| CN | 110046517 | 7/2019 |
| TW | 201837747 | 10/2018 |
| WO | WO2016106752 | 7/2016 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Application No. PCT/CN2019/108054, dated Dec. 27, 2019, 9 pages (with partial English translation).

* cited by examiner

US 11,108,547 B2

METHODS AND APPARATUSES FOR READING BLOCKCHAIN DATA

CROSS-REFERENCE TO RELATED APPLICATIONS

This application is a continuation of PCT Application No. PCT/CN2019/108054, filed on Sep. 26, 2019, which claims priority to Chinese Patent Application No. 201811320468.3, filed on Nov. 7, 2018, and each application is hereby incorporated by reference in its entirety.

TECHNICAL FIELD

Embodiments of the present specification relate to the field of information technologies, and in particular, to methods and apparatuses for reading blockchain data.

BACKGROUND

Blockchain networks are decentralized and distributed data storage systems involving multiple nodes. Once data is written to a blockchain on each node, on the one hand, it means that the data is made public to an entire network; on the other hand, it is difficult to delete and tamper with the data written to the blockchain. Based on this, blockchain technologies have great application prospects in the field of data recording.

However, in actual applications, once some data (referred to as sensitive data in the present specification) is written to a blockchain, irreversible harmful consequences may occur. For example, Mr Zhang slandered Mr. Li and uploads a text file of slanders to a blockchain network for recordation, thereby causing the text file to be recorded to a blockchain. Any node in the blockchain network can read the text file from the blockchain, thereby consequently creating an irreversible record that can damage the reputation of Mr. Li. For another example, company A stole trade secrets from company B and uploads the stolen trade secrets to a blockchain network for recording, thereby causing the trade secrets to be recorded on a blockchain. Any node in the blockchain network can read the trade secrets from the blockchain, which can cause irreparable harm to company B.

SUMMARY

To alleviate a problem that writing sensitive data to blockchains easily causes harmful consequences, embodiments of the present specification provide methods and apparatuses for reading blockchain data. Technical solutions are as follows:

According to a first aspect of the embodiments of the present specification, a method for reading a transaction written to a blockchain is provided, where for any transaction written to the blockchain, a correspondence between a transaction identifier of the transaction and a transaction storage position of the transaction in the blockchain is pre-recorded on each node in a blockchain network, and the method includes the following: any node in the blockchain network receives a data reading request; determines a transaction storage position corresponding to a target transaction identifier as a target transaction storage position based on the target transaction identifier included in the data reading request and the pre-recorded correspondence between the transaction identifier and the transaction storage position; and reads data from the target transaction storage position in the blockchain, where if a transaction corresponding to the target transaction identifier in the blockchain is replaced with concealed data, the read data is the concealed data; the concealed data includes a transaction hash of the transaction corresponding to the target transaction identifier; an operation of replacing the transaction corresponding to the target transaction identifier with the concealed data is performed by a node having a transaction concealment permission in the blockchain network by instructing each node.

According to a second aspect of the embodiments of the present specification, an apparatus for reading a blockchain data is provided, where the apparatus is any node in a blockchain network; for any transaction written to a blockchain, a correspondence between a transaction identifier of the transaction and a transaction storage position of the transaction in the blockchain is pre-recorded on each node in the blockchain network, and the apparatus includes the following: a receiving module, configured to receive a data reading request; a determination module, configured to determine a transaction storage position corresponding to a target transaction identifier as a target transaction storage position based on the target transaction identifier included in the data reading request and the pre-recorded correspondence between the transaction identifier and the transaction storage position; and a reading module, configured to read data from the target transaction storage position in the blockchain as found data, where if a transaction corresponding to the target transaction identifier in the blockchain is replaced with concealed data, the read data is the concealed data; the concealed data includes a transaction hash of the transaction corresponding to the target transaction identifier; an operation of replacing the transaction corresponding to the target transaction identifier with the concealed data is performed by a node having a transaction concealment permission in the blockchain network by instructing each node.

According to a third aspect of the embodiments of the present specification, a blockchain system is provided, including a blockchain network including a plurality of nodes; for any transaction written to a blockchain, a correspondence between a transaction identifier of the transaction and a transaction storage position of the transaction in the blockchain is pre-recorded on each node in the blockchain network; and any node in the blockchain network receives a data reading request; determines a transaction storage position corresponding to a target transaction identifier as a target transaction storage position based on the target transaction identifier included in the data reading request and the pre-recorded correspondence between the transaction identifier and the transaction storage position; and reads data from the target transaction storage position in the blockchain, where if a transaction corresponding to the target transaction identifier in the blockchain is replaced with concealed data, the read data is the concealed data; the concealed data includes a transaction hash of the transaction corresponding to the target transaction identifier; an operation of replacing the transaction corresponding to the target transaction identifier with the concealed data is performed by a node having a transaction concealment permission in the blockchain network by instructing each node.

In the technical solutions provided in the embodiments of the present specification, if a certain transaction written to a blockchain is sensitive data that should not be made public, each node in the blockchain network can replace the transaction with a transaction hash of the transaction. On the one hand, the transaction hash of the transaction is obtained through calculation by performing a one-way hash algorithm (in other words, a hash algorithm) on the transaction. The transaction cannot be deduced from the transaction hash of the transaction. Therefore, replacing the transaction with the transaction hash of the transaction is equivalent to encrypting published plaintext content of the transaction in the blockchain and then concealing the plaintext content. On the other hand, replacing the transaction with the transaction hash of the transaction does not affect the stability of a Merkle tree corresponding to a block that the transaction is located in, and also does not affect the accuracy of simplified payment verification (SPV) for other transactions (transactions located in the same block as the transaction), thereby ensuring normal operation of data recording services. When the transaction requested to be read from the blockchain includes the sensitive data, data returned by the node in the blockchain network to a user is actually not plaintext content of the transaction.

It should be understood that the previous general descriptions and the following detailed descriptions are only illustrative and explanatory, and cannot limit the embodiments of the present specification.

In addition, any one of the embodiments in the present specification does not need to achieve all the previous effects.

BRIEF DESCRIPTION OF DRAWINGS

To describe the technical solutions in the embodiments of the present specification or in the existing technology more clearly, the following briefly describes the accompanying drawings needed for describing the embodiments or the existing technology. Clearly, the accompanying drawings in the following descriptions merely show some embodiments recorded in the embodiments of the present specification, and a person of ordinary skill in the art can still derive other drawings from these accompanying drawings.

DETAILED DESCRIPTION

Figure 1:
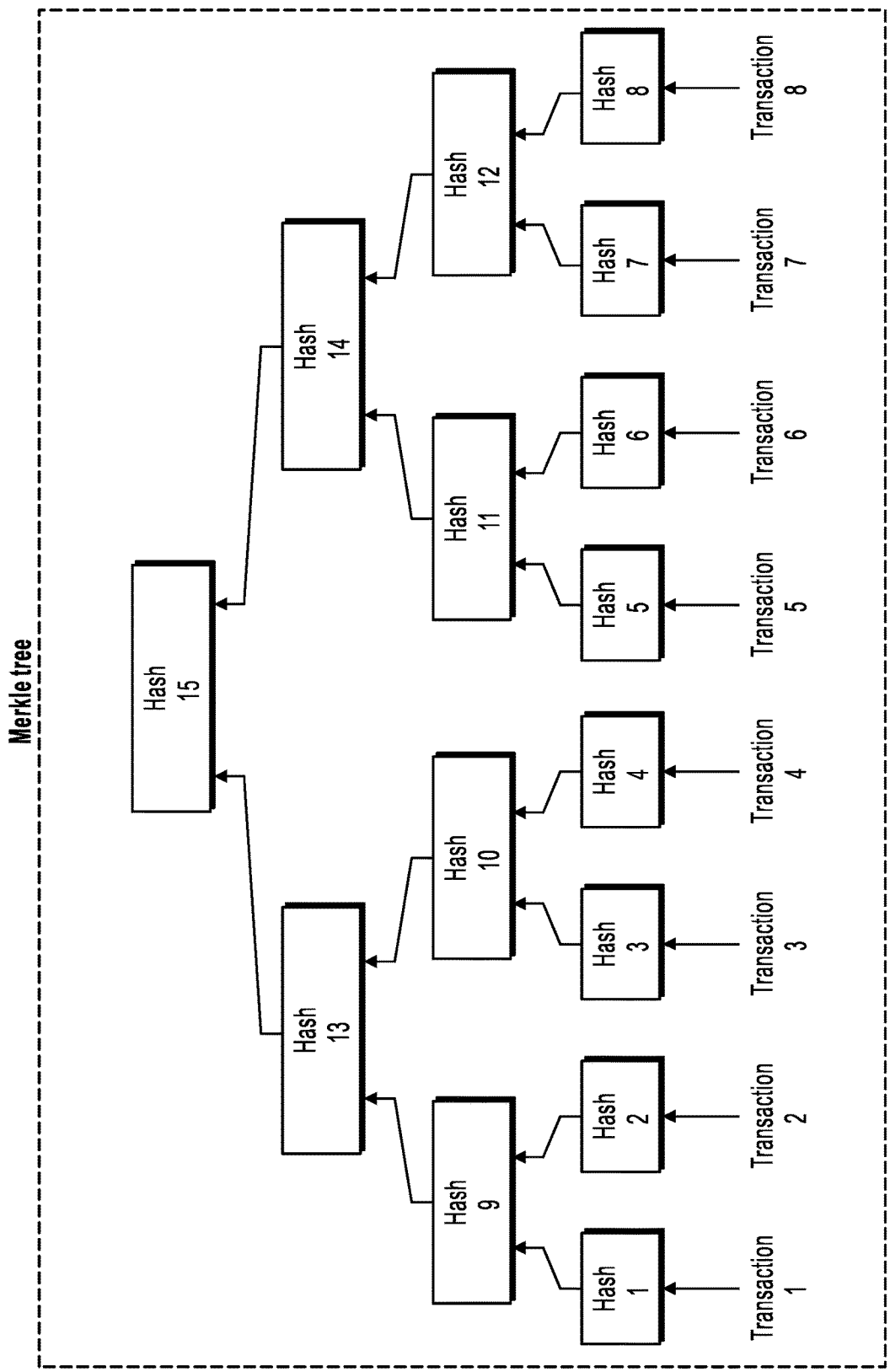
FIG. 1 is a schematic structural diagram illustrating a Merkle tree, according to the present specification.

It is worthwhile to note that a transaction described in the present specification is a piece of data created by a user by using a client device of a blockchain and needing to be finally published to a distributed database of the blockchain. The transaction is a data structure agreed in a blockchain protocol. To record a piece of data in the blockchain, the piece of data needs to be encapsulated into a transaction.

Transactions in the blockchain are classified into a transaction in a narrow sense and a transaction in a broad sense. The transaction in a narrow sense is a transfer of value published by a user to the blockchain. For example, in a traditional Bitcoin blockchain network, the transaction can be a transfer initiated by the user in the blockchain. The transaction in a broad sense is a piece of service data, with a service intention, published by the user to the blockchain. For example, an operator can construct a consortium blockchain based on actual service needs, and rely on the consortium blockchain to deploy some other types of online services unrelated to value transfers (such as a house rental service, a vehicle dispatching service, insurance and claim settlement services, a credit service, or a medical service). However, in this type of consortium blockchain, the transaction can be a service message or a service request, with a service intention, published by the user in the consortium blockchain.

In a blockchain-based data recording scenario, once the transaction is written to the blockchain, the transaction is permanently recorded and cannot be deleted or tampered with. However, in actual applications, if a transaction written to the blockchain is subsequently determined to include sensitive data that should not be made public, how to stop the sensitive data written to the blockchain from being made public becomes a technical problem difficult to reduce.

Assuming that the sensitive transaction (the transaction including the sensitive data) written to the blockchain is directly deleted, it can easily cause abnormality of a blockchain-based data recording service running. The reasons can be provided as follows:

It is generally known that, in consideration of a weak storage capability of some nodes, nodes in a blockchain network are classified into a full node and a light node. A complete data backup exists in a blockchain of the full node, that is, each block includes both a block header and a block body. Each transaction in the block is stored in the block body, and a root hash of a Merkle tree constructed based on transactions in the block is stored in the block header. However, there is no complete data backup exists in a blockchain of the light node, that is, each block has only a block header but has no block body.

When a user requests a certain light node to verify whether data previously uploaded by the user has been written to a blockchain, since each block in the blockchain of the light node only includes the block header, the light node needs to verify, based on the full node, whether a certain transaction has been written to the blockchain. This is the so-called SPV.

It is worth emphasizing that in the field of blockchain technologies, the so-called SPV in a broad sense is to verify whether a certain transaction has been written to the blockchain. A principle of the SPV is that the light node requests the full node to verify whether a certain transaction (referred to as a target transaction) has been written to the blockchain. The full node first locates a block that the target transaction is located in (referred to as a target block), constructs a Merkle tree based on transactions in the target block, determines a Merkle verification path corresponding to the target transaction, and returns a hash value associated with the Merkle path corresponding to the target transaction to the light node. The light node verifies, based on the hash value returned by the full node, whether the Merkle path corresponding to the target transaction is correct, that is, calculates a root hash of the Merkle tree based on a transaction hash of the target transaction and the hash value returned by the full node, and determines whether the calculated root hash is consistent with a root hash in a block header of the target block stored in the light node. If the calculated root hash is consistent with the root hash in the block header of the target block stored in the light node, the verification is deemed to succeed, proving that the target transaction has been indeed written to the blockchain.

FIG. 1 is a schematic structural diagram illustrating a Merkle tree, according to the present specification. As shown in FIG. 1, in the Merkle tree, each leaf node is in a one-to-one correspondence with each transaction stored in a target block. A hash value on each leaf node is a transaction hash obtained by performing a hash operation on a corresponding transaction. For each parent node, a hash value on the parent node is obtained by performing a hash operation on hash values on two subnodes of the parent node.

Assume that a target transaction includes transaction 1. A light node needs to verify whether transaction 1 is written to a blockchain. Then the light node sends a request to any full node, and the full node first determines a target block and constructs the Merkle tree shown in FIG. 1. Then the full node determines that hash values associated with a Merkle path corresponding to transaction 1 are hash 2, hash 10, and hash 14, and returns hash 2, hash 10, and hash 14 to the light node. The light node can calculate a root hash of the Merkle tree based on hash 1 (a transaction hash of transaction 1), hash 2, hash 10, and hash 14. If the light node identifies that the calculated root hash is consistent with a root hash stored in a block header of the target block, transaction 1 is deemed to be written to the blockchain.

Clearly, before triggering SPV for the target transaction, the full node usually needs to construct the Merkle tree based on transactions in the target block. In this way, a hash value associated with a Merkle path corresponding to the target transaction can be returned to the light node so as to trigger SPV for the target transaction. It also means that, if any one of transaction 1 to transaction 8 is tampered with or deleted, root hashes (in other words, hash 1 to hash 8) of the Merkle tree change so as to affect the accuracy of SPV.

For example, as shown in FIG. 1, transaction 2 includes sensitive data. If transaction 2 is directly deleted from the blockchain, when SPV needs to be performed for any one of transaction 1 and transaction 3 to transaction 8, a Merkle tree can be constructed based on only transaction 1 and transaction 3 to transaction 8 due to absence of transaction 2. In this way, a root hash of the constructed Merkle tree is inconsistent with the root hash stored in the block header of the target block, thereby causing an SPV error.

Therefore, based on the present specification, a certain transaction in the blockchain can be concealed when SPV in a blockchain system is not interfered with. A core technical method of the present specification is to replace, with a transaction hash of a transaction, the transaction that needs to be concealed in the blockchain. In this way, plaintext content of the transaction public can be stopped from being published without disturbing smooth operation of an SPV system in the blockchain system.

To make a person skilled in the art better understand the technical solutions in the embodiments of the present specification, the following describes in detail the technical solutions in the embodiments of the present specification with reference to the accompanying drawings in the embodiments of the present specification. Clearly, the described embodiments are merely some but not all of the embodiments of the present specification. All other embodiments obtained by a person of ordinary skill in the art based on the embodiments of the present specification shall fall within the protection scope of the present specification.

The technical solutions provided by the embodiments of the present specification are described below in detail with reference to the accompanying drawings.

Figure 2:
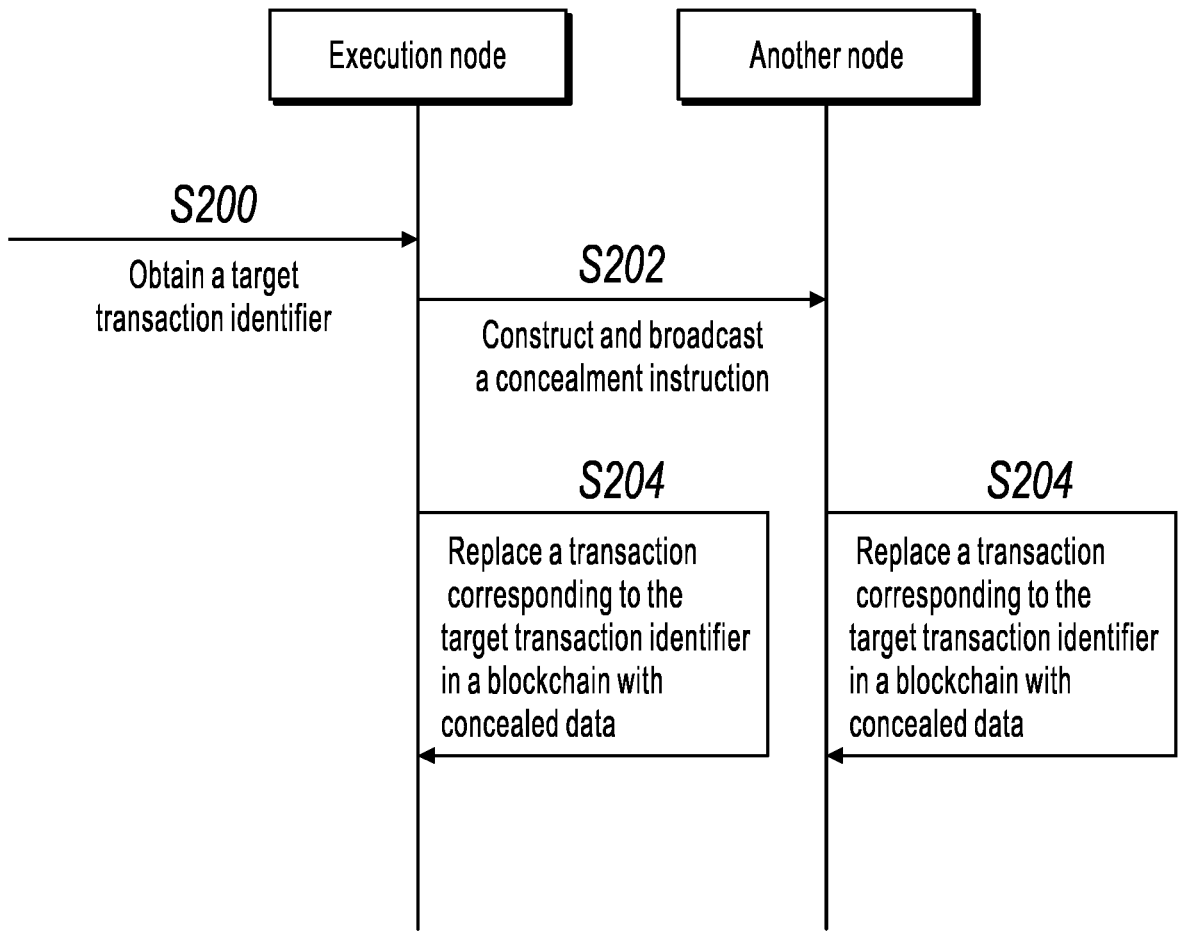
FIG. 2 is a schematic flowchart illustrating a method for concealing a transaction written to a blockchain, according to an embodiment of the present specification.

FIG. 2 is a schematic flowchart illustrating a method for concealing a transaction written to a blockchain, according to an embodiment of the present specification. The method includes the following steps:

S200: An execution node obtains a target transaction identifier.

The present specification is applied to a blockchain-based data recording scenario. In such a scenario, a blockchain network including a plurality of nodes performs distributed recording on data.

In some embodiments of the present specification, a transaction concealment permission can be granted to at least one node in the blockchain network. A node having a transaction concealment permission in this specification is referred to as an execution node. Further, each node in the blockchain network can be the execution node.

In some embodiments of the present specification, a transaction identifier of a transaction is used to uniquely identify the transaction. Specifically, the transaction identifier of the transaction can be a transaction hash obtained after a hash operation is performed on the transaction, or can be a unique number allocated to the transaction.

In step S200, the target transaction identifier can be sent by a certain user to the execution node. The user can be a user uploading sensitive data, or can be a subject (such as a court or a victim) that has the right to request to conceal the sensitive data. That is, when the sensitive data needs to be concealed, the target transaction identifier can be a transaction identifier of a transaction including the sensitive data.

Certainly, based on this solution, not only the sensitive data but also insensitive data can be concealed. Therefore, in a broad sense, the target transaction identifier can be a transaction identifier of any transaction.

S202: The execution node constructs a concealment instruction including the target transaction identifier, and broadcasts the concealment instruction to the blockchain network.

Specifically, the execution node can sign the concealment instruction, and broadcasts the signed concealment instruction to the blockchain network.

S204: For each node in the blockchain network, the node replaces a transaction corresponding to the target transaction identifier in the blockchain with concealed data based on the concealment instruction.

For each node in the blockchain network, the node can specifically verify a signature on the concealment instruction first. If the signature verification succeeds, it is confirmed that the concealment instruction is sent by the execution node, and the node needs to confirm that the execution node does have a transaction concealment permission. Then the node performs a transaction concealment operation.

Further, in actual applications, if a record of each transaction concealment operation also needs to be written to the blockchain for recording, the execution node can specifically encapsulate the concealment instruction into a transaction and broadcast the transaction to the blockchain network In this way, each node in the blockchain network can write, to the blockchain, the concealment instruction encapsulate into the transaction.

It is worthwhile to note here that, in some embodiments of the present specification, a blockchain used to store a data recording transaction can be different from the blockchain used to store the transaction of the concealment instruction. In this way, for each node in the blockchain network, two blockchains need to be maintained on the node.

In some embodiments of the present specification, after receiving the concealment instruction, each node needs to construct concealed data, and replaces the transaction corresponding to the target transaction identifier with the constructed concealed data. The concealed data includes a transaction hash of the transaction corresponding to the target transaction identifier. In this specification, the transaction hash of the transaction is an operation result obtained after a hash operation is performed on the transaction once.

Specifically, if the target transaction identifier is the transaction hash of the corresponding transaction, each node can directly use the transaction hash as the concealed data. If the target transaction identifier is not the transaction hash of the corresponding transaction, each node can first perform a hash operation on the transaction corresponding to the target transaction identifier, to obtain the transaction hash, and then use the transaction hash as the concealed data.

Afterwards, each node replaces, with the concealed data, the transaction corresponding to the target transaction identifier in the blockchain.

In this specification, a transaction storage position is storage space or a storage address used to store a transaction in the blockchain. Assuming that N (N is a natural number greater than 1) transactions are written to the blockchain, the blockchain also simultaneously has N transaction storage positions that are respectively used to store the N transactions.

In some embodiments of the present specification, each node can traverse each transaction in the blockchain based on the target transaction identifier, to search for the transaction corresponding to the target transaction identifier, that is, locate a transaction storage position of the transaction corresponding to the target transaction identifier. Afterwards, the transaction corresponding to the target transaction identifier is deleted from the located transaction storage position, and the transaction hash of the transaction corresponding to the target transaction identifier is saved at the located transaction storage position.

Further, for the node, the efficiency of locating the transaction through traversing in the blockchain based on the target transaction identifier is relatively low. Therefore, in some embodiments of the present specification, for any transaction written to the blockchain, each node can separately pre-record, outside the blockchain, a correspondence between a transaction identifier of the transaction and a transaction storage position of the transaction in the blockchain.

For any transaction written to the blockchain, the transaction storage position of the transaction in the blockchain is generally a height of a block that the transaction is located in (that is, a sequence number of the block in the blockchain) and a sequence number of the transaction in the block. For example, after a block that transaction A is packaged into is written to a fourth block in the blockchain, a height of the block that transaction A is packaged into is 5, and transaction A is a tenth transaction in the block. Therefore, a transaction storage position corresponding to transaction A can be (5, 10).

Each node in the blockchain network can determine the transaction storage position corresponding to the target transaction identifier as a target transaction storage position based on the target transaction identifier included in the concealment instruction and the pre-recorded correspondence between the transaction identifier and the transaction storage position; then directly locate the target transaction storage position in the blockchain, and replace the transaction stored at the target transaction storage position in the blockchain with the concealed data.

Besides, in some embodiments of the present specification, in addition to the transaction hash of the transaction corresponding to the target transaction identifier, the concealed data can further include more information.

Figure 3:
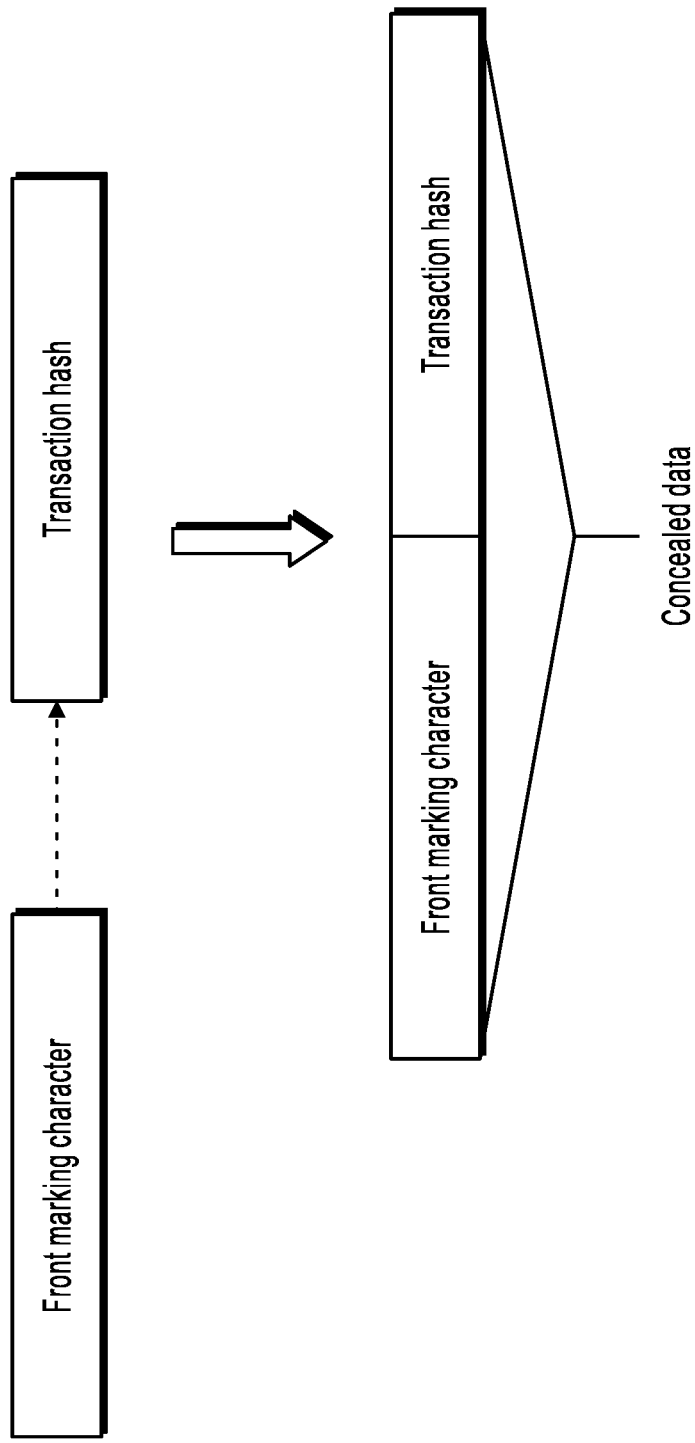
FIG. 3 is a schematic diagram illustrating a process of constructing concealed data, according to an embodiment of the present specification.

Specifically, FIG. 3 is a schematic diagram illustrating a process of constructing concealed data, according to an embodiment of the present specification. When constructing the concealed data, each node can obtain the transaction hash of the transaction corresponding to the target transaction identifier; concatenate a predetermined front marking character to a header of the transaction hash; and determine the concealed data based on data obtained by concatenating the front marking character and the transaction hash.

Figure 4:
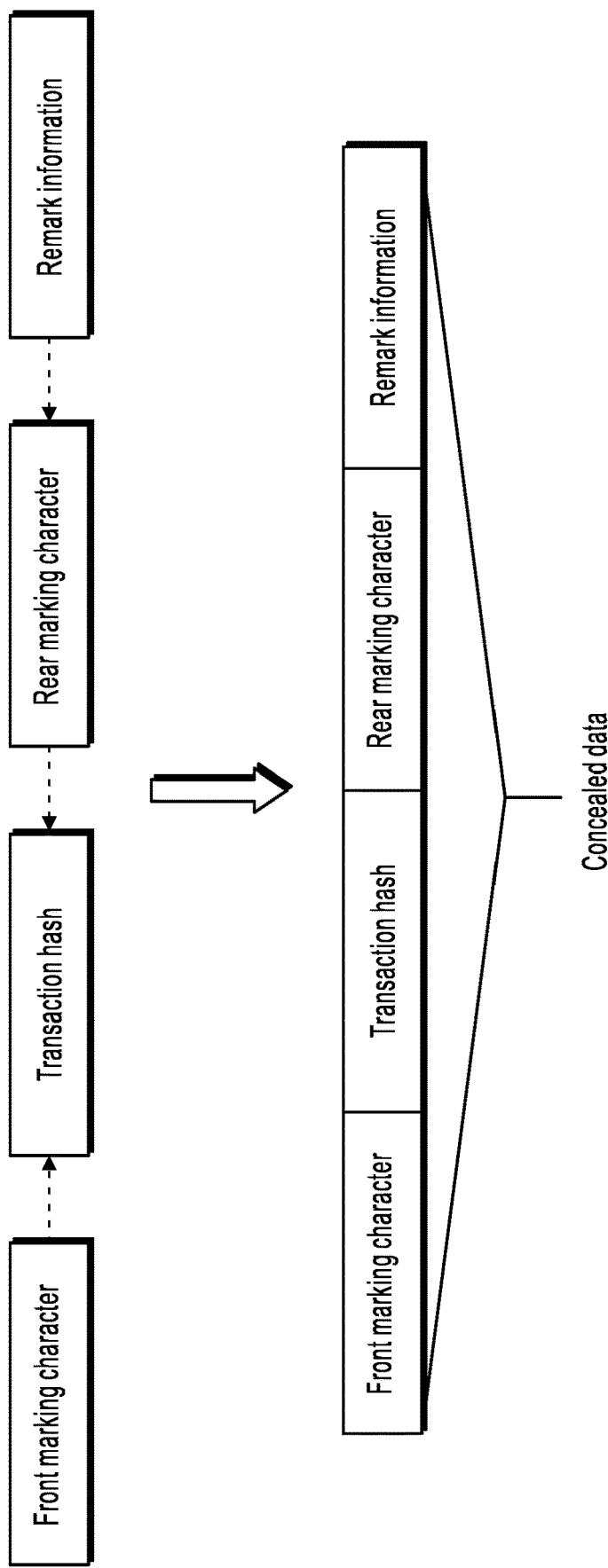
FIG. 4 is a schematic diagram illustrating another process of constructing concealed data, according to an embodiment of the present specification.

Further, FIG. 4 is a schematic diagram illustrating another process of constructing concealed data, according to some embodiments of the present specification. When constructing the concealed data, each node can obtain the transaction hash of the transaction corresponding to the target transaction identifier; concatenate a predetermined front marking character to a header of the transaction hash, concatenate a predetermined rear marking character to an end of the transaction hash, and concatenate remark information to an end of the rear marking character; and determine, as the concealed data, data obtained by concatenating the front marking character, the transaction hash, the rear marking character, and the remark information.

It is worthwhile to note that the front marking character and the rear marking character can be specified based on actual needs. For example, the front marking character can be "OE", and the rear marking character can be "OF".

It is further worthwhile to note that the remark information can be specifically information needing to be added to implement a specific service. For example, the remark information can be "hidden", indicating that the transaction corresponding to the target transaction identifier is hidden. When a user queries for the transaction corresponding to the target transaction identifier, the remark information can notify the user that the transaction is concealed.

It is worth emphasizing that when a node reads data for a certain transaction storage position, if a transaction at the transaction storage position has been replaced with concealed data, a front marking character in the concealed data can reveal the following information to the node: "A transaction hash instead of plaintext content of the transaction is stored at the transaction storage position". In addition, when the concealed data includes the remark information, the rear marking character can separate the transaction hash and the remark information that are in the concealed data so that the node can distinguish between the transaction hash and the remark information.

In addition, it is worthwhile to note that, in some embodiments of the present specification, logic code corresponding to a transaction concealment operation performed by each node can be written to firmware of each node in advance, or can be deployed on each node in a form of a smart contract in advance.

Figure 5:
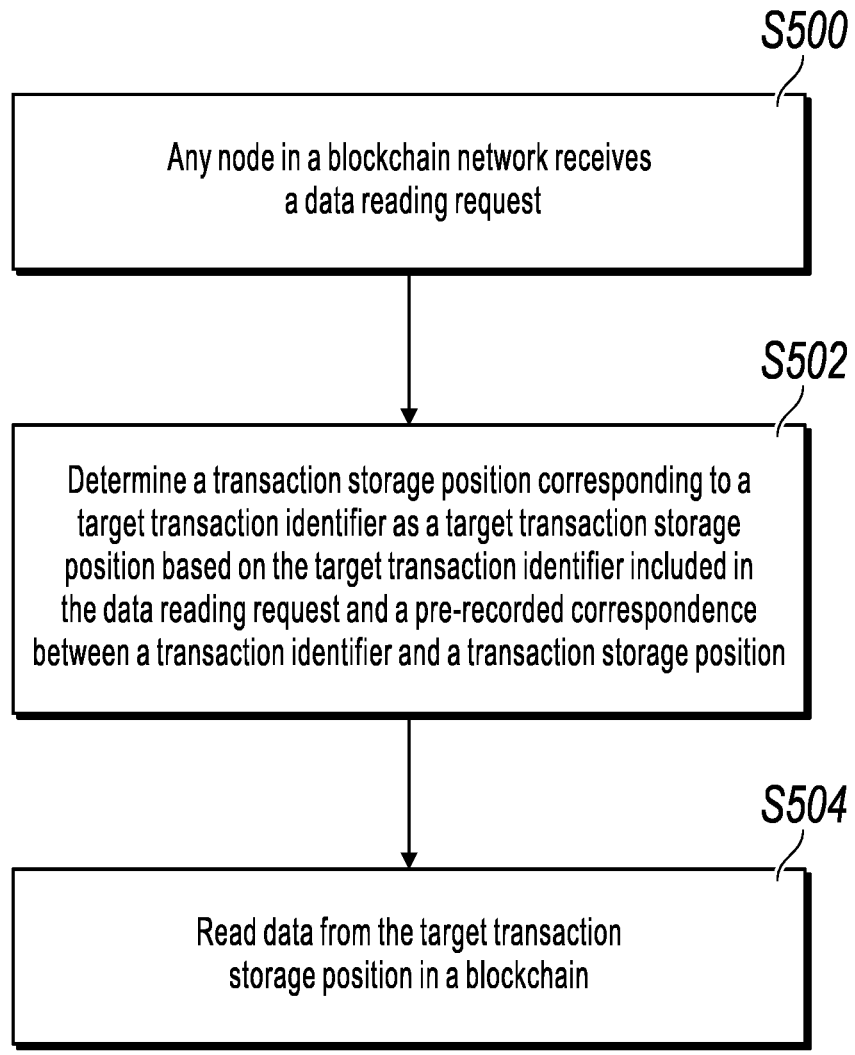
FIG. 5 is a schematic flowchart illustrating a method for reading blockchain data, according to an embodiment of the present specification.

FIG. 5 is a schematic flowchart illustrating a method for reading blockchain data, according to an embodiment of the present specification. The method includes the following steps:

S500: Any node in a blockchain network receives a data reading request.

In the method shown in FIG. 5, the data reading request can be sent by a user. When intending to query for a certain transaction in a blockchain, the user needs to send a transaction query request including a transaction identifier of the transaction to any node in the blockchain network. For convenience of description, in descriptions of the method shown in FIG. 5, a transaction identifier of any transaction that the user intends to query for is referred to as a target transaction identifier.

S502: Determine a transaction storage position corresponding to the target transaction identifier as a target transaction storage position based on the target transaction identifier included in the data reading request and a prerecorded correspondence between a transaction identifier and a transaction storage position.

As described above, in some embodiments of the present specification, for any transaction written to the blockchain, each node in the blockchain network can pre-record the correspondence between the transaction identifier of the transaction and the transaction storage position of the transaction in the blockchain. In this way, the node can directly locate, based on the target transaction identifier in the transaction query request, the transaction storage position that the user intends to query for in the blockchain.

S504: Read data from the target transaction storage position in the blockchain as found data.

After locating the target transaction storage position, the node can directly read the data from the target transaction storage position, and then return the read data for the data reading request.

If the transaction corresponding to the target transaction identifier in the blockchain has been replaced with concealed data, the data read by the node is the concealed data. If the transaction corresponding to the target transaction identifier in the blockchain has not been replaced with concealed data, the data read by the node is the transaction corresponding to the target transaction identifier.

Clearly, if the transaction corresponding to the target transaction identifier has been concealed because the transaction includes sensitive data, when a user queries for the transaction corresponding to the target transaction identifier, the node actually returns concealed data to the user, and the user cannot see plaintext content of the transaction corresponding to the target transaction identifier.

In addition, if the concealed data includes not only a transaction hash but also a front marking character, after reading the concealed data from the target transaction storage position, the node can determines, through analysis, that the concealed data includes the front marking character. Therefore, the node can return notification information for the data reading request, to indicate that the transaction corresponding to the target transaction identifier of the user has been replaced with the concealed data. In such case, the node can choose not to return the concealed data, but returns only a notification message for description.

Alternatively, if the concealed data includes not only a transaction hash, but also a front marking character, a rear marking character, and remark information, the node can return the remark information to the user after reading the concealed data from the target transaction storage position. In such case, the node can also choose not to return the concealed data to the user. For example, the remark information is "hidden", and after receiving the remark information returned by the node, the user determines that the transaction corresponding to the target transaction identifier has been hidden.

In addition, it is generally known that, for each block in the blockchain, at the beginning of creation of the block, the Merkle tree shown in FIG. 1 is constructed based on transactions in the block, a root hash of the Merkle tree is calculated, and the root hash is written to a block header of the block. After the block is written to the blockchain, once the transaction in the block is tampered with or deleted, the root hash of the Merkle tree constructed based on the transactions in the block changes, and is inconsistent with a root hash in the block header. Because of this, it is difficult to temper with and delete data in the blockchain.

When a light node needs to perform SPV based on a full node, the full node determines, based on a target transaction identifier provided by the light node, the block that the transaction corresponding to the target transaction identifier is located in, and constructs the Merkle tree based on the transactions in the block. Then, SPV for the transaction corresponding to the target transaction identifier is triggered based on the constructed Merkle tree.

However, in some embodiments of the present specification, for any block in the blockchain, a certain transaction in the block can be replaced with the concealed data. Based on this, the present specification correspondingly provides an improved Merkle tree construction method and an improved SPV method.

Figure 6:
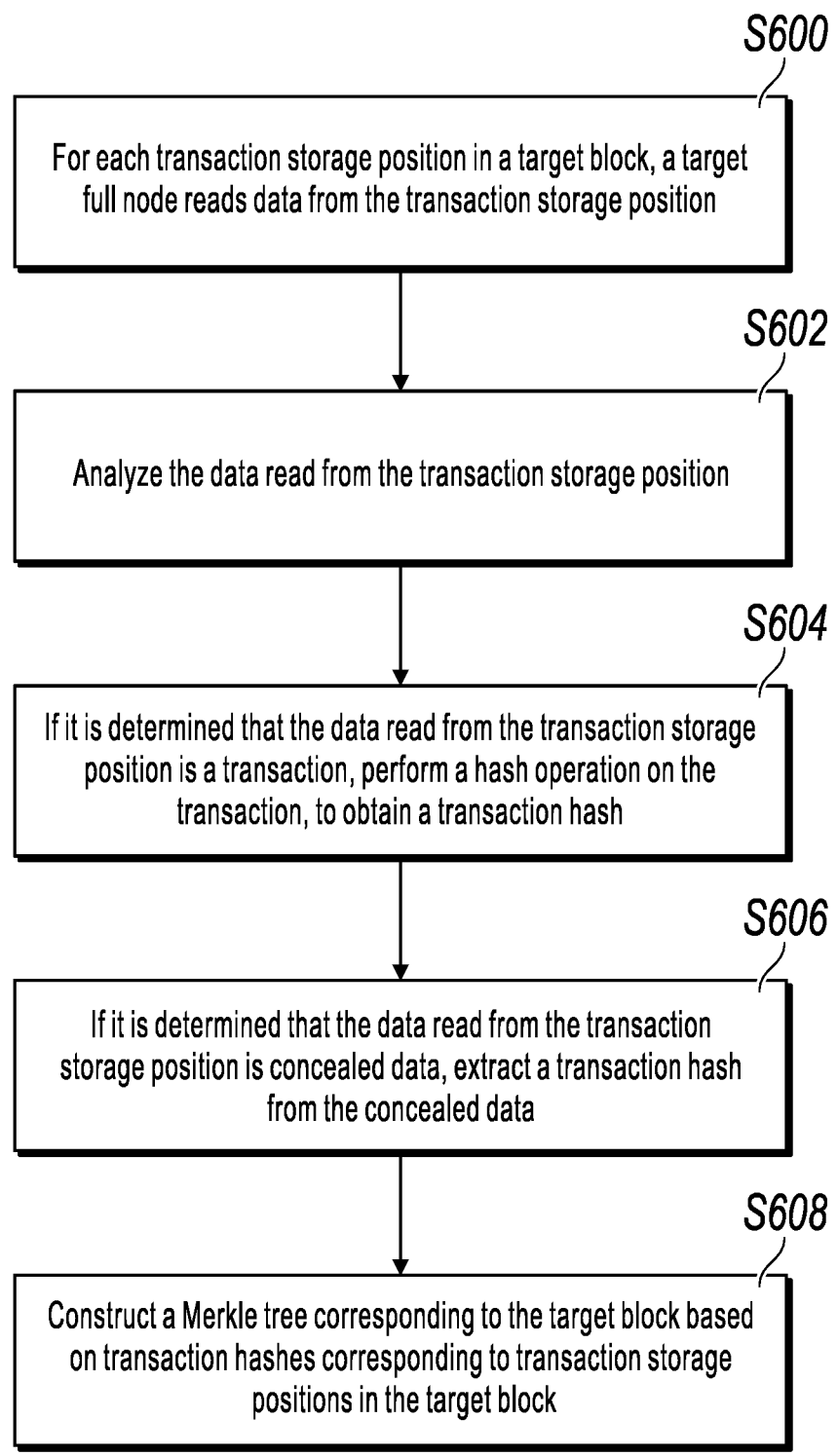
FIG. 6 is a schematic flowchart illustrating a Merkle tree construction method, according to an embodiment of the present specification.

FIG. 6 is a schematic flowchart illustrating Merkle tree construction method, according to an embodiment of the present specification. The method includes the following steps.

S600: For each transaction storage position in a target block, a target full node reads data from the transaction storage position.

In the method shown in FIG. 6, the target full node is any full node in a blockchain network, and the target block is any block in a blockchain of the target full node.

In the target block, each transaction is generally stored at a transaction storage position of each transaction. If a certain transaction is replaced with concealed data, the concealed data is currently stored at a transaction storage position that the transaction is originally stored at.

When needing to construct a Merkle tree corresponding to the target block, the target full node reads data from each transaction storage position of the target block.

S602: Analyze the data read from the transaction storage position.

For each transaction storage position, the target full node analyzes the data read from the transaction storage position, to determine whether the data read from the transaction storage position is a transaction or concealed data.

Specifically, because a transaction is a data structure agreed in a blockchain protocol, the target full node can accordingly determine whether the data read from the transaction storage position is a transaction. If the data read from transaction storage position is not the transaction, the data is the concealed data.

In addition, if the concealed data includes not only a transaction hash but also a front marking character, the target full node can also determine whether the data read from the transaction storage position is the concealed data. If the concealed data includes the front marking character, the data read from the transaction storage position is the concealed data; or if the concealed data does not include the front marking character, the data read from the transaction storage position is transaction.

S604: If it is determined that the data read from the transaction storage position is the transaction, perform a hash operation on the transaction, to obtain a transaction hash.

S606: If it is determined that the data read from the transaction storage position is the concealed data, extract a transaction hash from the concealed data.

The transaction hash extracted from the concealed data is a transaction hash of the transaction originally stored at the transaction storage position. An operation of replacing, with the concealed data, the transaction originally stored at the transaction storage position is performed by a node having a transaction concealment permission in the blockchain network by instructing each node.

It is worthwhile to note here that, if the concealed data is obtained by concatenating the front marking character and the transaction hash, the target full node can specifically determine data located after the front marking character in the concealed data as the transaction hash and extract the transaction hash.

If the concealed data is obtained by concatenating the front marking character, the transaction hash, a rear marking character, and remark information, the target full node can specifically determine data located between the front marking character and the rear marking character in the concealed data as the transaction hash and extract the transaction hash.

S608: Construct the Merkle tree corresponding to the target block based on transaction hashes corresponding to transaction storage positions in the target block.

Figure 7:
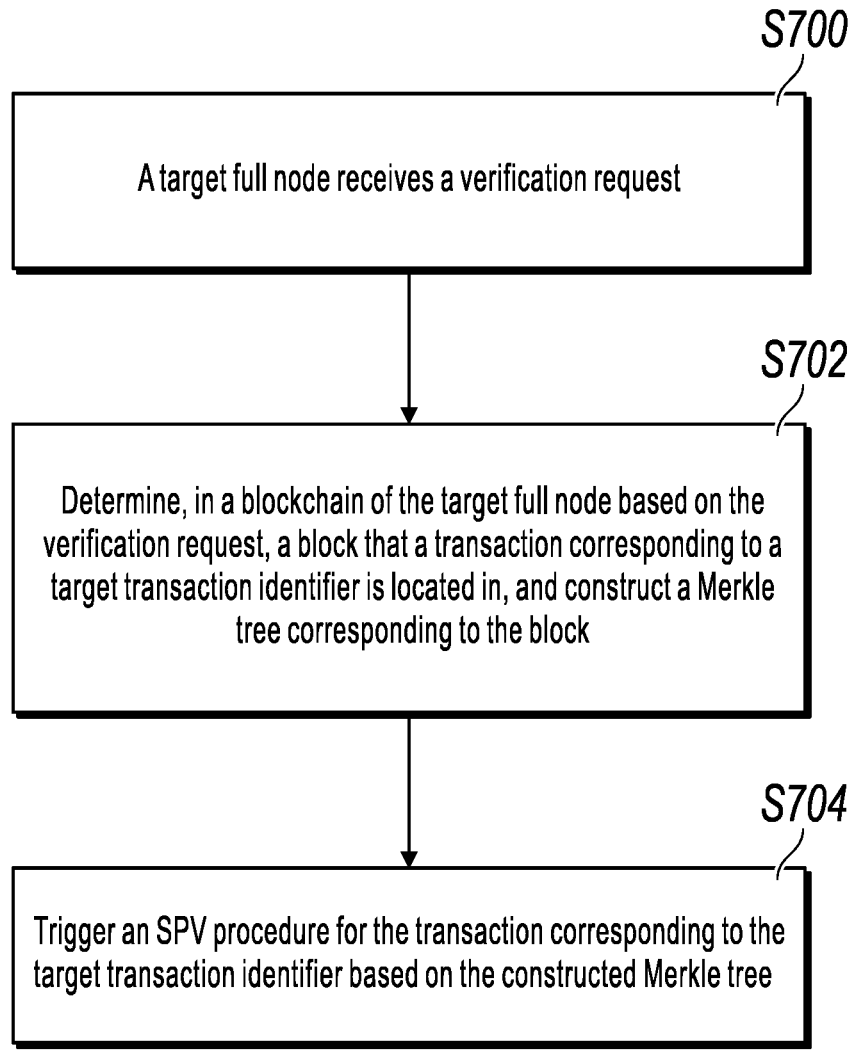
FIG. 7 is a schematic flowchart illustrating an SPV method, according to an embodiment of the present specification.

FIG. 7 is a schematic flowchart illustrating an SPV method, according to an embodiment of the present specification. The method includes the following steps:

S700: A target full node receives a verification request.

The target full node is any full node in a blockchain network. The verification request can be specifically sent by any light node in the blockchain network.

S702: Determine, in a blockchain of the target full node based on the verification request, a block that a transaction corresponding to a target transaction identifier is located in, and construct a Merkle tree corresponding to the block.

Generally, before triggering an SPV procedure for the transaction corresponding to the target transaction identifier, the target full node needs to first locate the block that the transaction corresponding to the target transaction identifier is located in, and constructs the Merkle tree based on transactions currently included in the block. It is worthwhile to note that, in step S702, the target full node constructs the Merkle tree based on the method shown in FIG. 5.

In step S702, the target full node can determine a transaction storage position corresponding to the target transaction identifier as a target transaction storage position based on the target transaction identifier and a pre-recorded correspondence between a transaction identifier and a transaction storage position; then determine, as the block that the transaction corresponding to the target transaction identifier is located in, a block that includes the target transaction storage position.

S704: Trigger an SPV procedure for the transaction corresponding to the target transaction identifier based on the constructed Merkle tree.

After constructing the Merkle tree, the target full node can trigger the SPV procedure for the transaction corresponding to the target transaction identifier.

Specifically, the target full node determines a Merkle verification path of the transaction corresponding to the target transaction identifier based on the constructed Merkle tree, and returns a hash value associated with the Merkle path to a light node so that the light node calculates a root hash of the Merkle tree based on a transaction hash of the transaction corresponding to the target transaction identifier and the hash value returned by the target full node, and compares the calculated root hash with a root hash in a block header of the block that the transaction corresponding to the target transaction identifier is located in. If the calculated root hash is consistent with the root hash in the block header, the verification is deemed to succeed; or if the calculated root hash is inconsistent with the root hash in the block header, the verification is deemed to fail.

Figure 8:
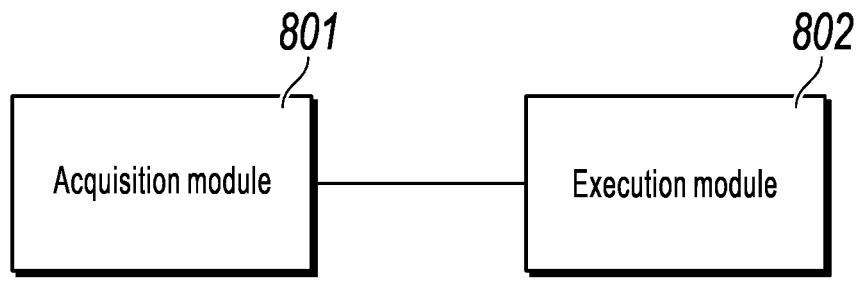
FIG. 8 is a schematic structural diagram illustrating an apparatus for concealing a transaction written to a blockchain, according to an embodiment of the present specification.

FIG. 8 is a schematic structural diagram illustrating an apparatus for concealing a transaction written to a blockchain, according to an embodiment of the present specification. The apparatus is a node having a transaction concealment permission in a blockchain network, and includes the following: an acquisition module 801, configured to obtain a target transaction identifier; and an execution module 802, configured to construct a concealment instruction including the target transaction identifier and broadcast the concealment instruction to the blockchain network so that each node in the blockchain network replaces a transaction corresponding to the target transaction identifier in the blockchain with concealed data based on the concealment instruction, where the concealed data includes a transaction hash of the transaction corresponding to the target transaction identifier.

Figure 9:
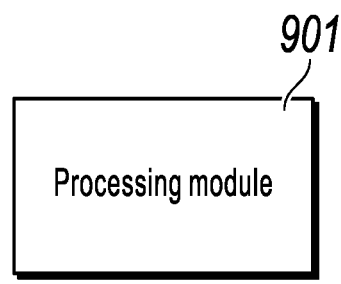
FIG. 9 is a schematic structural diagram illustrating an apparatus for concealing a transaction written to a blockchain, according to an embodiment of the present specification.

FIG. 9 is a schematic structural diagram illustrating an apparatus for concealing a transaction written to a blockchain, according to an embodiment of the present specification. The apparatus is any node in a blockchain network, and includes the following: a processing module 901, configured to replace a transaction corresponding to a target transaction identifier in the blockchain with concealed data based on a concealment instruction, where the concealed data includes a transaction hash of the transaction corresponding to the target transaction identifier, where the concealment instruction is constructed by an execution node based on the obtained target transaction identifier and is broadcast to the blockchain network; the execution node is a node having a transaction concealment permission in the blockchain network.

A blockchain system provided in an embodiment of the present specification includes a blockchain network including a plurality of nodes, where a node having a transaction concealment permission in the blockchain network obtains a target transaction identifier; and constructs a concealment instruction including the target transaction identifier, and broadcasts the concealment instruction to the blockchain network; and each node in the blockchain network replaces a transaction corresponding to the target transaction identifier in the blockchain with concealed data based on the concealment instruction, where the concealed data includes a transaction hash of the transaction corresponding to the target transaction identifier.

Figure 10:
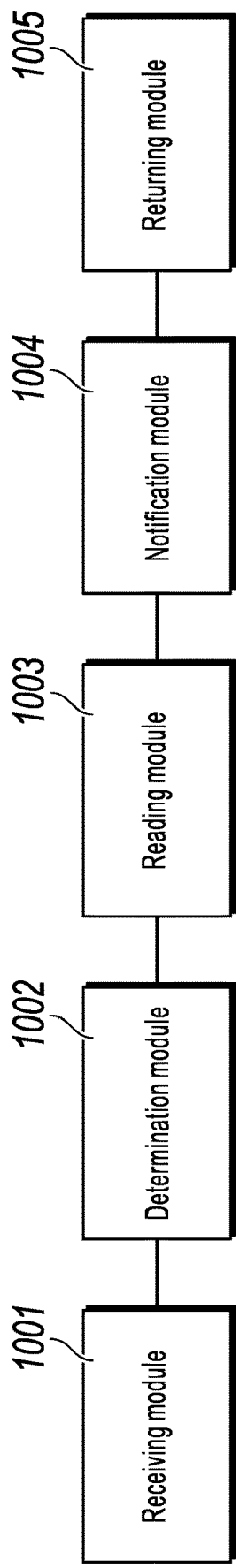
FIG. 10 is a schematic structural diagram illustrating an apparatus for reading blockchain data, according to an embodiment of the present specification.

FIG. 10 is a schematic structural diagram illustrating an apparatus for reading blockchain data, according to an embodiment of the present specification. The apparatus is any node in a blockchain network. For any transaction written to a blockchain, a correspondence between a transaction identifier of the transaction and a transaction storage position of the transaction in the blockchain is pre-recorded on each node in the blockchain network. The apparatus includes the following: a receiving module 1001, configured to receive a data reading request; a determination module 1002, configured to determine a transaction storage position corresponding to a target transaction identifier as a target transaction storage position based on the target transaction identifier included in the data reading request and the pre-recorded correspondence between the transaction identifier and the transaction storage position; and a reading module 1003, configured to read data from the target transaction storage position in the blockchain as found data, where if a transaction corresponding to the target transaction identifier in the blockchain is replaced with concealed data, the read data is the concealed data; the concealed data includes a transaction hash of the transaction corresponding to the target transaction identifier; an operation of replacing the transaction corresponding to the target transaction identifier with the concealed data is performed by a node having a transaction concealment permission in the blockchain network by instructing each node.

The operation of replacing the transaction corresponding to the target transaction identifier with the concealed data is as follows:

obtaining the transaction hash of the transaction corresponding to the target transaction identifier;

concatenating a predetermined front marking character to a header of the transaction hash;

determining the concealed data based on data obtained by concatenating the front marking character and the transaction hash; and replacing the transaction corresponding to the target transaction identifier with the concealed data.

The determining the concealed data based on data obtained by concatenating the front marking character and the transaction hash specifically includes the following:

concatenating a predetermined rear marking character to an end of the transaction hash, and concatenating remark information to an end of the rear marking character; and determining, as the concealed data, data obtained by concatenating the front marking character, the transaction hash, the rear marking character, and the remark information.

The apparatus further includes the following: a notification module 1004, configured to return notification information for the data reading request if the read data includes the front marking character, to indicate that the transaction corresponding to the target transaction identifier is replaced with the concealed data.

The apparatus further includes the following: a returning module 1005, configured to return the read data for the data reading request.

A blockchain system includes a blockchain network including a plurality of nodes; for any transaction written to a blockchain, a correspondence between a transaction identifier of the transaction and a transaction storage position of the transaction in the blockchain is pre-recorded on each node in the blockchain network.

Any node in the blockchain network receives a data reading request; determines a transaction storage position corresponding to a target transaction identifier as a target transaction storage position based on the target transaction identifier included in the data reading request and the pre-recorded correspondence between the transaction identifier and the transaction storage position; and reads data from the target transaction storage position in the blockchain.

If a transaction corresponding to the target transaction identifier in the blockchain is replaced with concealed data, the read data is the concealed data; the concealed data includes a transaction hash of the transaction corresponding to the target transaction identifier; an operation of replacing the transaction corresponding to the target transaction identifier with the concealed data is performed by a node having a transaction concealment permission in the blockchain network by instructing each node.

Figure 11:
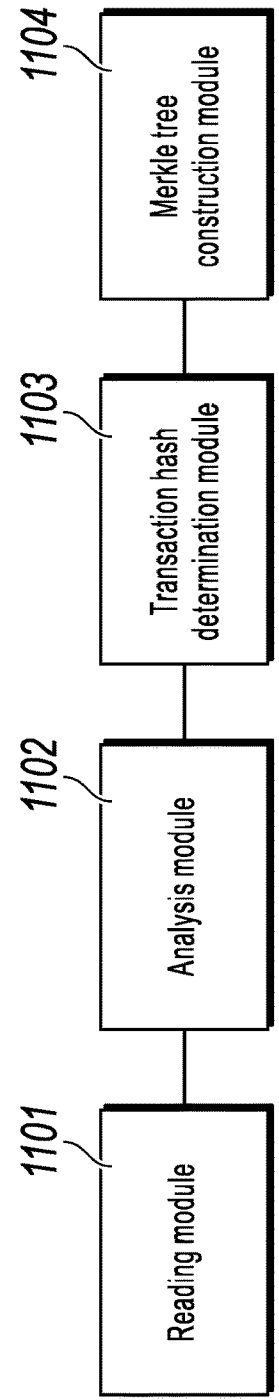
FIG. 11 is a schematic structural diagram illustrating a Merkle tree construction apparatus, according to an embodiment of the present specification.

FIG. 11 is a schematic structural diagram illustrating a Merkle tree construction apparatus, according to an embodiment of the present specification. The apparatus is any full node in a blockchain network, and includes the following: a reading module 1101, configured to: for each transaction storage position in a target block, read data from the transaction storage position, where the target block is any block in a blockchain of the apparatus; an analysis module 1102, configured to analyze the data read from the transaction storage position; a transaction hash determination module 1103, configured to: if it is determined that the data read from the transaction storage position is a transaction, perform a hash operation on the transaction, to obtain a transaction hash; or if it is determined that the data read from the transaction storage position is concealed data, extract a transaction hash from the concealed data, where the transaction hash extracted from the concealed data is a transaction hash of a transaction originally stored at the transaction storage position; an operation of replacing, with the concealed data, the transaction stored at the transaction storage position is performed by a node having a transaction concealment permission in the blockchain network by instructing each node; and a Merkle tree construction module 1104, configured to construct a Merkle tree corresponding to the target block based on transaction hashes corresponding to transaction storage positions in the target block.

The operation of replacing, with the concealed data, the transaction stored at the transaction storage position is as follows:

obtaining a transaction hash of the transaction stored at the transaction storage position;

concatenating a predetermined front marking character to a header of the transaction hash;

determining the concealed data based on data obtained by concatenating the front marking character and the transaction hash; and replacing, with the concealed data, the transaction stored at the transaction storage position.

The determining the concealed data based on data obtained by concatenating the front marking character and the transaction hash specifically includes the following:

concatenating a predetermined rear marking character to an end of the transaction hash, and concatenating remark information to an end of the rear marking character; and determining, as the concealed data, data obtained by concatenating the front marking character, the transaction hash, the rear marking character, and the remark information.

The analysis module 1102 is configured to: if the data read from the transaction storage position does not include the front marking character, determine, as the transaction, the data read from the transaction storage position; or if the data read from the transaction storage position includes the front marking character, determine, as the concealed data, the data read from the transaction storage position.

The transaction hash determination module 1103 is configured to determine, as the transaction hash, data located after the front marking character in the concealed data and extract the transaction hash.

The transaction hash determination module 1103 is configured to determine data located between the front marking character and the rear marking character in the concealed data as the transaction hash and extract the transaction hash.

Figure 12:
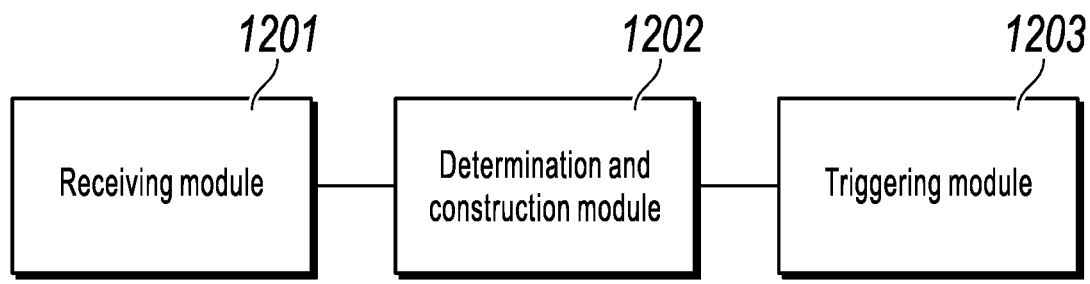
FIG. 12 is a schematic structural diagram illustrating an SPV apparatus, according to an embodiment of the present specification.

FIG. 12 is a schematic structural diagram illustrating an SPV apparatus, according to an embodiment of the present specification. The apparatus is any full node in a blockchain network, and includes the following: a receiving module 1201, configured to receive a verification request, where the verification request includes a target transaction identifier; a determination and construction module 1202, configured to determine, in a blockchain of the SPV apparatus based on the verification request, a block that a transaction corresponding to the target transaction identifier is located in, and construct a Merkle tree corresponding to the block based on the previous method; and a triggering module 1203, configured to trigger an SPV procedure for the transaction corresponding to the target transaction identifier based on the constructed Merkle tree.

For any transaction written to the blockchain, a correspondence between a transaction identifier of the transaction and a transaction storage position of the transaction in the blockchain is pre-recorded on each node in the blockchain network.

The determination and construction module 1202 is configured to determine a transaction storage position corresponding to the target transaction identifier as a target transaction storage position based on the target transaction identifier and the pre-recorded correspondence between the transaction identifier and the transaction storage position; and determine, as the block that the transaction corresponding to the target transaction identifier is located in, a block that includes the target transaction storage position.

A blockchain system includes a blockchain network including a plurality of nodes; and for each transaction storage position in a target block, any full node in the blockchain network reads data from the transaction storage position, where the target block is any block in a blockchain of a target full node; analyzes the data read from the transaction storage position; if it is determined that the data read from the transaction storage position is a transaction, performs a hash operation on the transaction, to obtain a transaction hash; or if it is determined that the data read from the transaction storage position is concealed data, extracts a transaction hash from the concealed data, where the transaction hash extracted from the concealed data is a transaction hash of a transaction originally stored at the transaction storage position; an operation of replacing, with the concealed data, the transaction stored at the transaction storage position is performed by a node having a transaction concealment permission in the blockchain network by instructing each node; and constructs a Merkle tree corresponding to the target block based on transaction hashes respectively corresponding to transaction storage positions in the target block.

A blockchain system includes a blockchain network including a plurality of nodes; and any full node in the blockchain network receives a verification request, where the verification request includes a target transaction identifier; determines, in a blockchain of the full node based on the verification request, a block that a transaction corresponding to the target transaction identifier is located in, and constructs a Merkle tree corresponding to the block based on the previous method; and triggers an SPV procedure for the transaction corresponding to the target transaction identifier based on the constructed Merkle tree.

Figure 13:
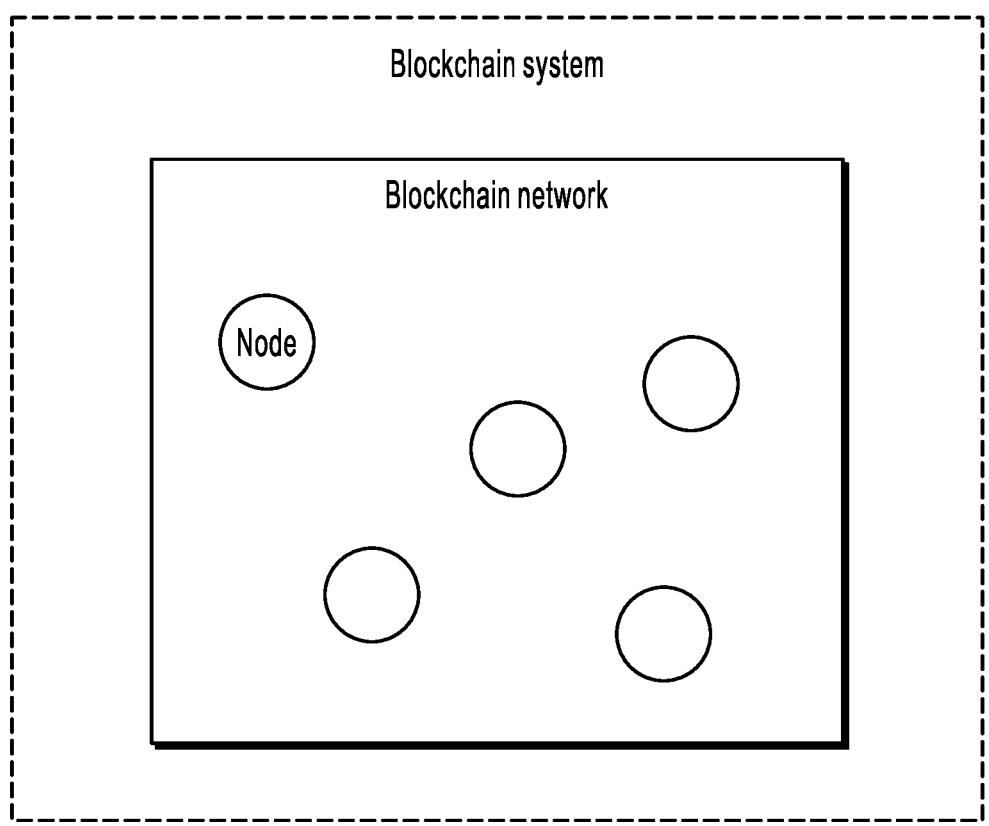
FIG. 13 is a schematic structural diagram illustrating a blockchain system, according to an embodiment of the present specification.

FIG. 13 is a schematic structural diagram illustrating a blockchain system, according to an embodiment of the present specification.

This embodiment of the present specification further provides a computer device, including at least a memory, a processor, and a computer program stored in the memory and capable of running on the processor, where when the processor executes the program, the functions of the methods shown in FIG. 2 and FIG. 5 to FIG. 7 are implemented.

Figure 14:
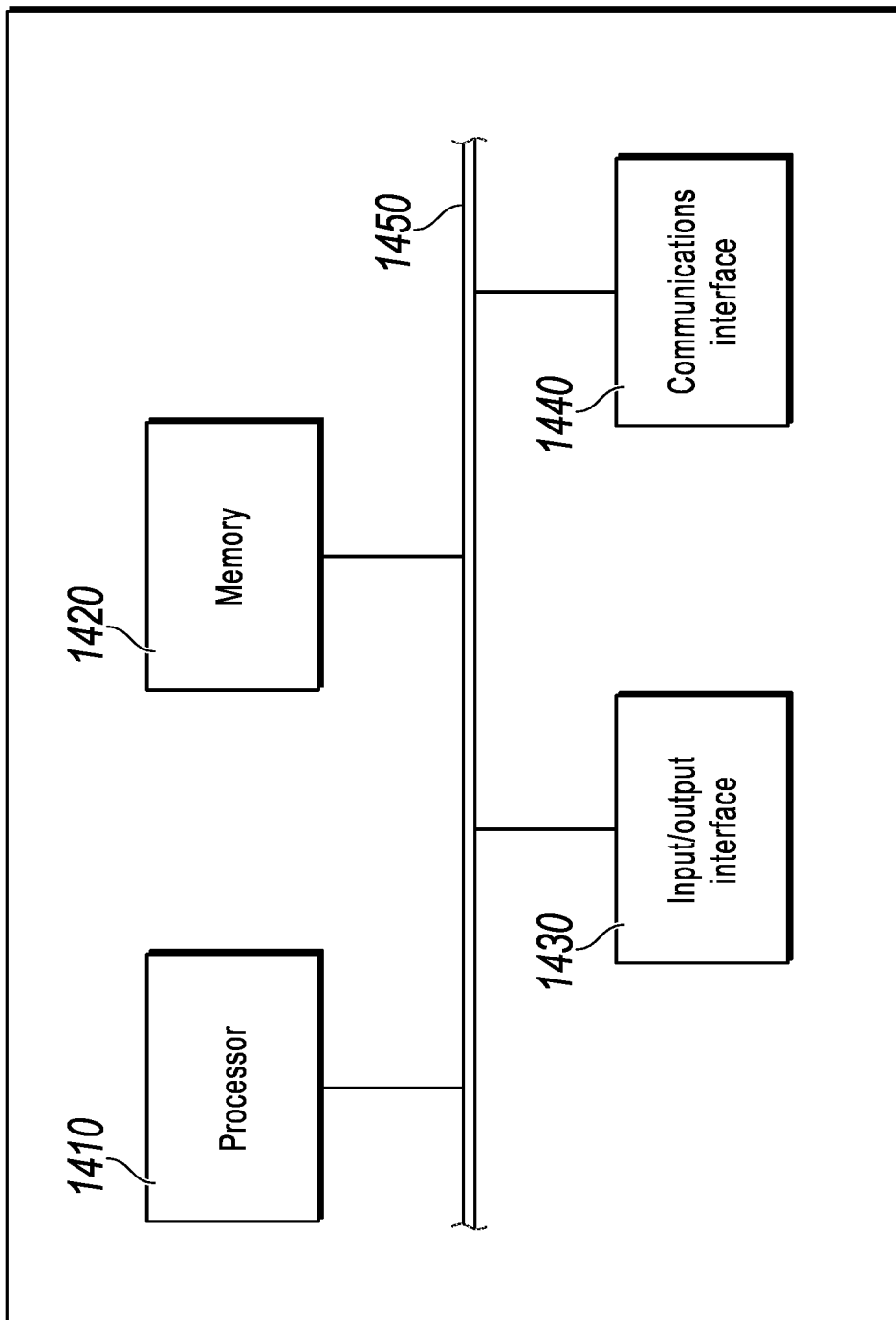
FIG. 14 is a schematic structural diagram illustrating a computer device used to configure an apparatus in an embodiment of the present specification.

FIG. 14 is a more specific schematic structural diagram illustrating computing device hardware, according to an embodiment of the present specification. The device can include: a processor 1410, a memory 1420, an input/output interface 1430, a communications interface 1440, and a bus 1450. The processor 1410, the memory 1420, the input/output interface 1430, and the communications interface 1440 implement a communication connection between each other within the device through the bus 1450.

The processor 1410 can be implemented by using a general central processing unit (CPU), a micro-processor, an application specific integrated circuit (ASIC), one or more integrated circuits, etc., and is configured to execute a related program, to implement the technical solutions provided by the embodiments of the present specification.

The memory 1420 can be implemented in a form of a read-only memory (ROM), a random access memory (RAM), a static storage device, a dynamic storage device, etc. The memory 1420 can store an operating system and other application programs. When the technical solutions provided by the embodiments of the present specification are implemented by using software or firmware, related program code is stored in the memory 1420 and is retrieved and executed by the processor 1410.

The input/output interface 1430 is configured to connect to an input/output module, to implement information input and output. The input/output module can be configured in the device (not shown in the figure) as a component, or can be externally connected to the device to provide a corresponding function. An input device can include a keyboard, a mouse, a touch screen, a microphone, various sensors, etc., and an output device can include a display, a speaker, a vibrator, an indicator light, etc.

The communications interface 1440 is configured to connect to a communications module (not shown in the figure) to implement communication exchange between the device and another device. The communications module can implement wired communication (such as a USB or a network cable) or wirelessly (such as a mobile network, WIFI, or Bluetooth).

The bus 1450 includes a path that transmits information between various components of the device (such as the processor 1410, the memory 1420, the input/output interface 1430, and the communications interface 1440).

It is worthwhile to note that although the previous device shows only the processor 1410, the memory 1420, the input/output interface 1430, the communications interface 1440, and the bus 1450, in a specific implementation process, the device can further include other components needed for normal operation. In addition, a person skilled in the art can understand that the previous device can also include only components necessary to implement the solutions of the embodiments of the present specification, and does not need to include all the components shown in the figure.

Some embodiments of the present specification further provide a computer-readable storage medium that a computer program is stored on, where when the program is executed by a processor, the functions of the methods shown in FIG. 2 and FIG. 5 to FIG. 7 are implemented.

The computer readable medium includes persistent, non-persistent, movable, and unmovable media that can store information by using any method or technology. The information can be a computer readable instruction, a data structure, a program module, or other data. Examples of the computer storage medium include, but are not limited to, a phase change random access memory (PRAM), a static RAM (SRAM), a dynamic RAM (DRAM), a RAM of another type, a ROM, an electrically erasable programmable ROM (EEPROM), a flash memory or another memory technology, a compact disc ROM (CD-ROM), a digital versatile disc (DVD) or another optical storage, a cassette, and a cassette magnetic disk storage, or another magnetic storage device or any other non-transmission medium. The computer storage medium can be configured to store information that can be accessed by a computing device. Based on the descriptions in the present specification, the computer readable medium does not include transitory media such as a modulated data signal and carrier.

It can be seen from the previous descriptions of the implementations that, a person skilled in the art can clearly understand that the embodiments of the present specification can be implemented by using software and a necessary general hardware platform. Based on such an understanding, the technical solutions in the embodiments of the present specification essentially or the part contributing to the existing technology can be implemented in a form of a software product. The computer software product can be stored in a storage medium, such as a ROM/RAM, a magnetic disk, or an optical disc, and includes several instructions for instructing a computer device (which can be a personal computer, a server, a network device, etc.) to perform the method described in the embodiments of the present specification or in some parts of the embodiments of the present specification.

The system, method, module, or unit illustrated in the previous embodiments can be specifically implemented by using a computer chip or an entity, or can be implemented by using a product having a certain function. A typical implementation device is a computer, and the computer can be specifically a personal computer, a laptop computer, a cellular phone, a camera phone, a smartphone, a personal digital assistant, a media player, a navigation device, an email receiving and sending device, a game console, a tablet computer, a wearable device, or any combination of these devices.

The embodiments in the present specification are described in a progressive way. For same or similar parts of the embodiments, references can be made to the embodiments mutually. Each embodiment focuses on a difference from other embodiments. Particularly, for method and device embodiments, the device embodiment is basically similar to the method embodiment, and therefore is described briefly. For a related part, references can be made to some descriptions in the method embodiment. The previously described method embodiments are merely examples. The modules described as separate parts can or does not have to be physically separate. During implementation of the solutions in the embodiments of the present specification, functions of the modules can be implemented in one or more pieces of software and/or hardware. Some or all of the modules can be selected based on an actual need to implement the objective of the solutions of the embodiments. A person of ordinary skill in the art can understand and implement the example without creative efforts.

The previous descriptions are merely specific implementations of the embodiments of the present specification. It is worthwhile to note that a person of ordinary skill in the art can further make several improvements or polishing without departing from the principle of the embodiments of the present specification, and the improvements or polishing shall fall within the protection scope of the embodiments of the present specification.

What is claimed is:

1. A method for retrieving blockchain data, comprising:
receiving, by a node in a blockchain network, a data retrieving request that comprises a target transaction identifier;
identifying, by the node, a transaction storage location that corresponds to the target transaction identifier as a target transaction storage location based on a pre-stored correspondence between transaction identifiers of transactions recorded on a blockchain associated with the blockchain network and transaction storage locations of the transactions; and
retrieving data from the target transaction storage location in the blockchain, wherein the data is concealed data that replaces a target transaction identified by the target transaction identifier and originally stored in the target transaction storage location, wherein the concealed data comprises a transaction hash of the target transaction, wherein replacing the target transaction identified by the target transaction identifier comprises:
obtaining the transaction hash of the target transaction;
concatenating a predetermined front marking character to a header of the transaction hash to generate a first concatenation;
identifying the concealed data based on the first concatenation; and
replacing the target transaction with the concealed data.

2. The method of claim 1, wherein replacing the target transaction identified by the target transaction identifier with the concealed data is instructed by a separate node in the blockchain network that has a transaction concealment permission to other nodes in the blockchain network.

3. The method according to claim 1, wherein identifying the concealed data based on the first concatenation comprises:
concatenating a predetermined rear marking character to an end of the first concatenation to generate a second concatenation; and
identifying the second concatenation as the concealed data.

4. The method according to claim 1, further comprising:
determining, by the node, that the retrieved data comprises the predetermined front marking character; and providing an indication, by the node in response to the data retrieving request, that the target transaction is replaced with the concealed data.

5. The method according to claim 1, further comprising: sending, by the node, the retrieved data in response to the data retrieving request.

6. A non-transitory, computer-readable medium storing one or more instructions executable by a computer system to perform operations comprising:
receiving, by a node in a blockchain network, a data retrieving request that comprises a target transaction identifier;
identifying, by the node, a transaction storage location that corresponds to the target transaction identifier as a target transaction storage location based on a pre-stored correspondence between transaction identifiers of transactions recorded on a blockchain associated with the blockchain network and transaction storage locations of the transactions; and
retrieving data from the target transaction storage location in the blockchain, wherein the data is concealed data that replaces a target transaction identified by the target transaction identifier and originally stored in the target transaction storage location, wherein the concealed data comprises a transaction hash of the target transaction, wherein replacing the target transaction identified by the target transaction identifier comprises:
obtaining the transaction hash of the target transaction;
concatenating a predetermined front marking character to a header of the transaction hash to generate a first concatenation;
identifying the concealed data based on the first concatenation; and
replacing the target transaction with the concealed data.

7. The non-transitory, computer-readable medium of claim 6, wherein replacing the target transaction identified by the target transaction identifier with the concealed data is instructed by a separate node in the blockchain network that has a transaction concealment permission to other nodes in the blockchain network.

8. The non-transitory, computer-readable medium according to claim 6, wherein identifying the concealed data based on the first concatenation comprises:
concatenating a predetermined rear marking character to an end of the first concatenation to generate a second concatenation; and
identifying the second concatenation as the concealed data.

9. The non-transitory, computer-readable medium according to claim 6, the operations further comprising:
determining, by the node, that the retrieved data comprises the predetermined front marking character; and
providing an indication, by the node in response to the data retrieving request, that the target transaction is replaced with the concealed data.

10. The non-transitory, computer-readable medium according to claim 6, the operations further comprising:
sending, by the node, the retrieved data in response to the data retrieving request.

11. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, by a node in a blockchain network, a data retrieving request that comprises a target transaction identifier;
identifying, by the node, a transaction storage location that corresponds to the target transaction identifier as a target transaction storage location based on a pre-stored correspondence between transaction identifiers of transactions recorded on a blockchain associated with the blockchain network and transaction storage locations of the transactions; and
retrieving data from the target transaction storage location in the blockchain, wherein the data is concealed data that replaces a target transaction identified by the target transaction identifier and originally stored in the target transaction storage location, wherein the concealed data comprises a transaction hash of the target transaction, wherein replacing the target transaction identified by the target transaction identifier comprises:
obtaining the transaction hash of the target transaction;
concatenating a predetermined front marking character to a header of the transaction hash to generate a first concatenation;
identifying the concealed data based on the first concatenation; and
replacing the target transaction with the concealed data.

12. The computer-implemented system of claim 11, wherein replacing the target transaction identified by the target transaction identifier with the concealed data is instructed by a separate node in the blockchain network that has a transaction concealment permission to other nodes in the blockchain network.

13. The computer-implemented system according to claim 11, wherein identifying the concealed data based on the first concatenation comprises:
concatenating a predetermined rear marking character to an end of the first concatenation to generate a second concatenation; and
identifying the second concatenation as the concealed data.

14. The computer-implemented system according to claim 11, the one or more operations further comprising:
determining, by the node, that the retrieved data comprises the predetermined front marking character; and
providing an indication, by the node in response to the data retrieving request, that the target transaction is replaced with the concealed data.

15. The computer-implemented system according to claim 11, the one or more operations further comprising:
sending, by the node, the retrieved data in response to the data retrieving request.

* * * * *